May 4, 1948. J. L. KENNEDY ET AL 2,440,957
PUPILLOMETER
Filed June 6, 1946  3 Sheets-Sheet 1

Inventors
JOHN L. KENNEDY, LEONARD C. MEAD,
BERTRAM WELLMAN,

By J.H. Church & W.E. Thibodeau
Attorneys

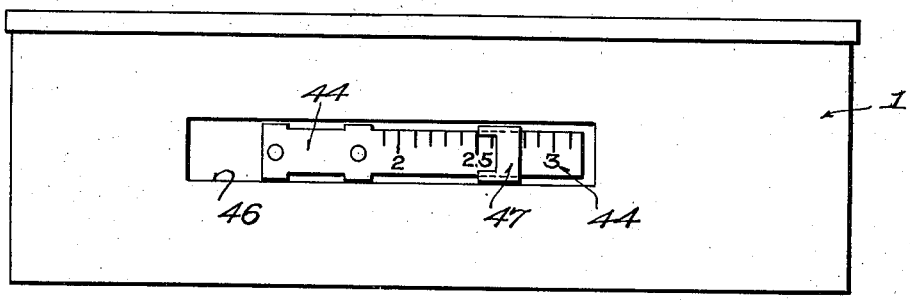
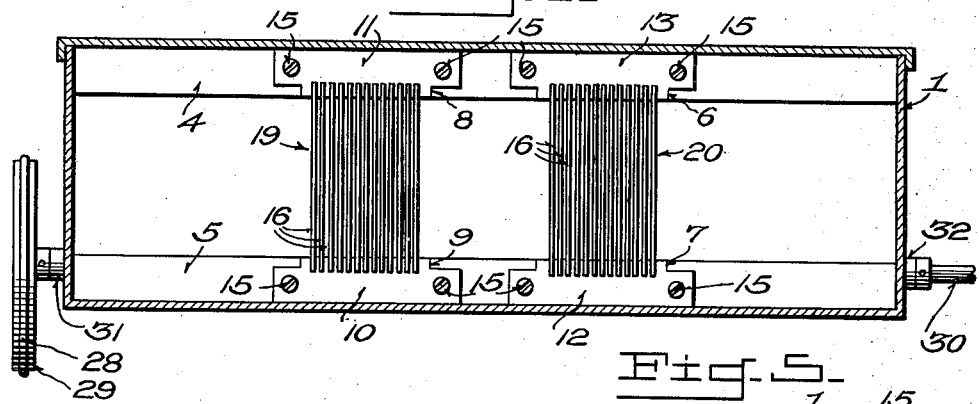
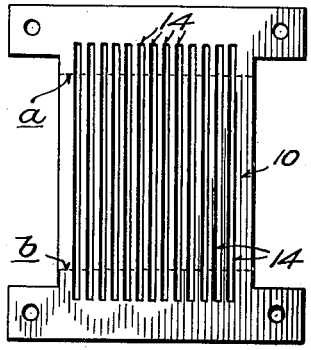
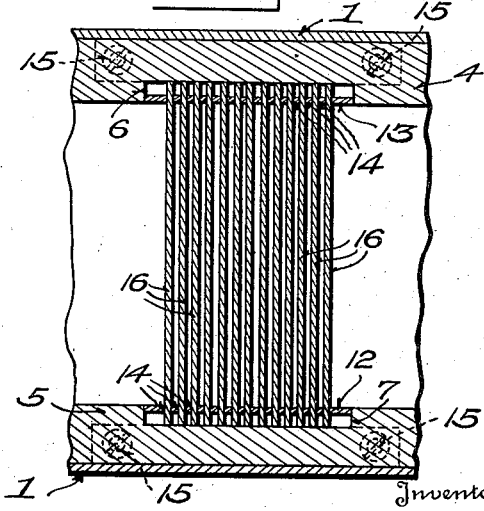

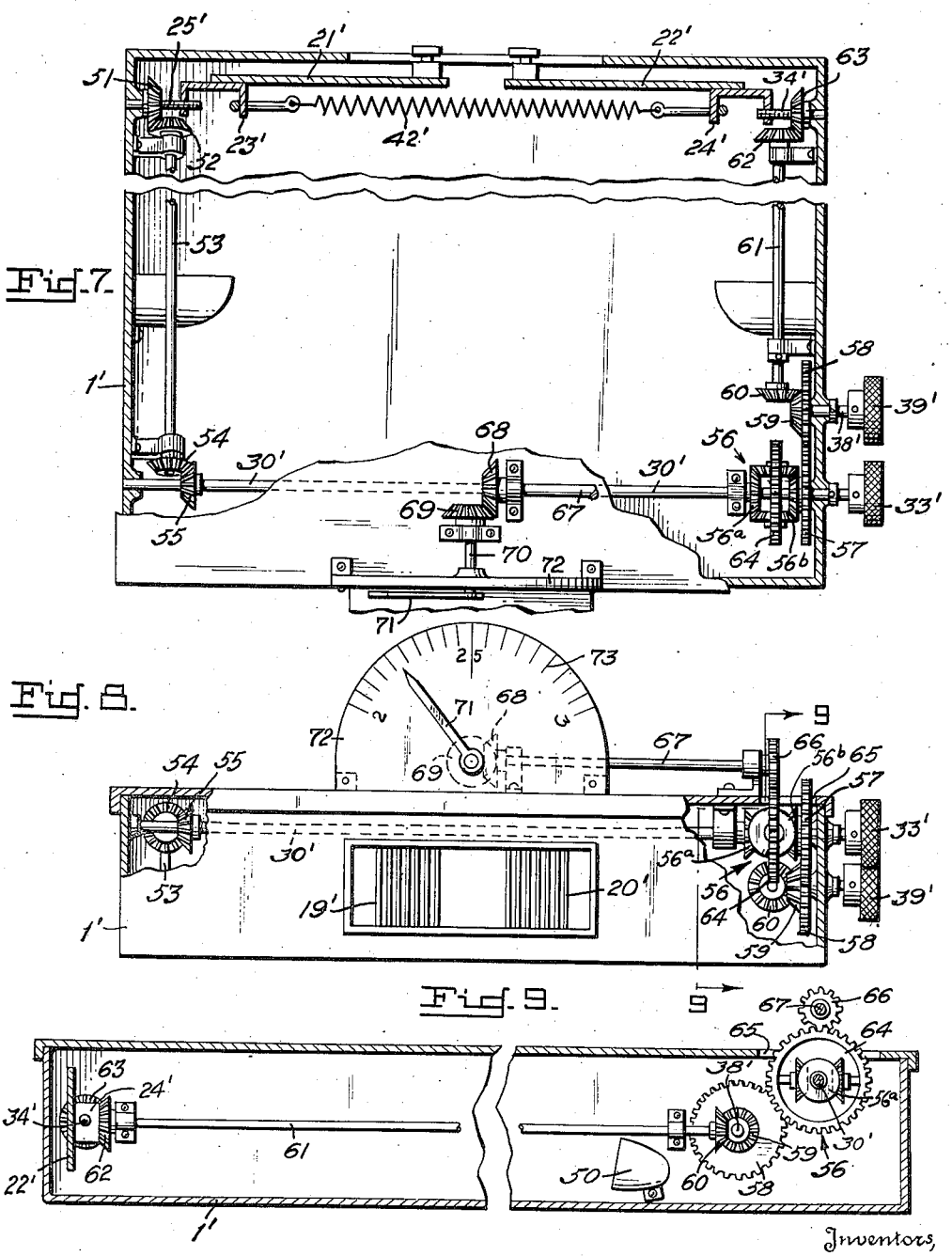

Patented May 4, 1948

2,440,957

UNITED STATES PATENT OFFICE 2,440,957

PUPILLOMETER

John L. Kennedy, Winchester, Leonard C. Mead, Somerville, and Bertram Wellman, Lincoln, Mass., assignors to the United States of America as represented by the Secretary of War Application June 6, 1946, Serial No. 674,726

10 Claims. (Cl. 88—20)

This invention relates to pupillometers or instruments for measuring the distance between the pupils of the eyes.

It is the principal object of the invention to provide an instrument of the type mentioned that is relatively simple, and inexpensive to construct, while at the same time, operating in a facile manner to give the desired dimension to any reasonable desired degree of accuracy.

It is a further object of the invention to provide an instrument as in the preceding paragraph, wherein an unmistakable visual indication or signal is effected when the person being measured has effected the correct adjustment of the instrument for his interpupillary distance.

A still further object is to provide an instrument whereby one may accurately measure the interpupillary distance of his own eyes.

Other objects and advantages of the invention will become apparent as the description proceeds.

In the drawings:

Figure 3 is an elevation of one end of the instrument showing the indicator for reading the desired dimension.

Figure 4 is a section taken substantially upon the line 4—4 of Figure 1 and showing the construction and mounting of the two sets of spaced parallel plates.

Figure 5 is a section taken substantially upon a plane indicated by the line 5—5 of Figure 1 and showing manner in which one set of plates is mounted and secured in position, it being understood that the mounting of the right and left sets of plates are identical.

Figure 6 is a development of one of the four plate mounts used in each instrument.

Figure 7 is a plan view, partly in section, of a modified form of the invention.

Figure 8 is a front elevation, partly in section, of the modification of Figure 7.

Figure 9 is a section taken upon a plane indicated by line 9—9, Figure 8.

Figure 1:
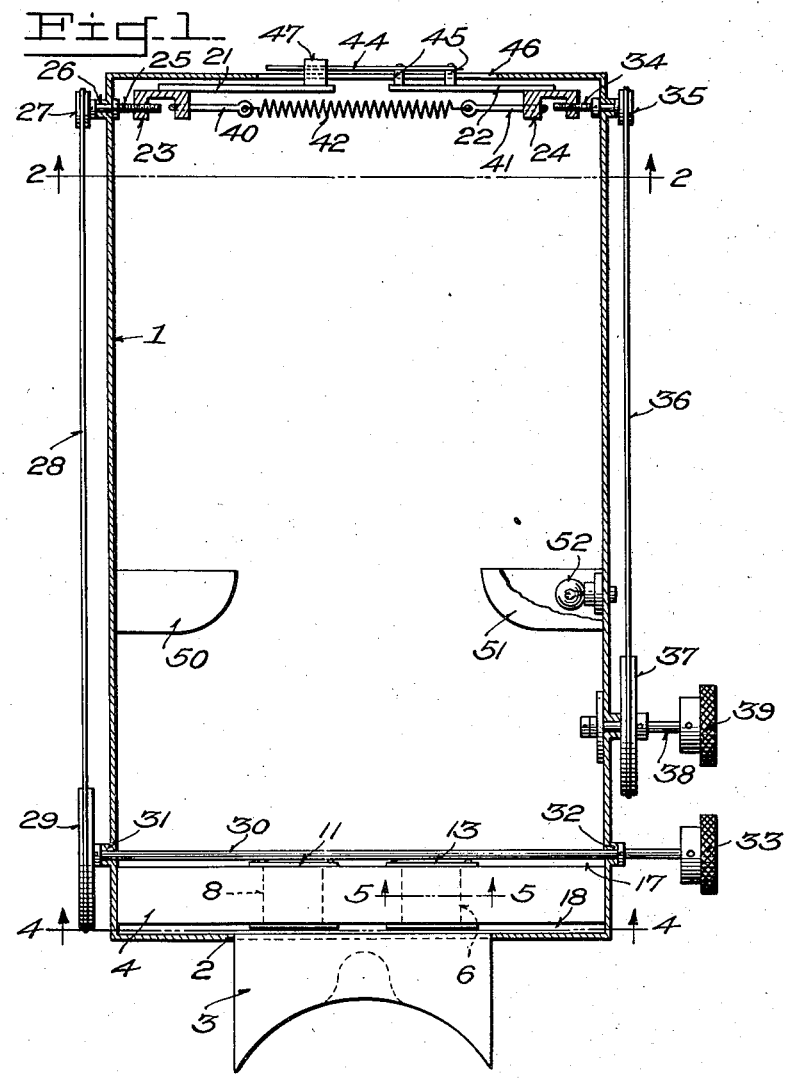
Figure 1 is a sectional plan view taken substantially upon the line 1—1 of Figure 2, and showing principally, the means by which the operator effects adjustment of the two targets whose separation determines the dimension sought.

The numeral 1 identifies a frame or casing rectangular in cross section and having an opening 2 in one end, within which a hood 3 is secured. The outer edges of hood 3 are shaped to fit the head of a user. Strips 4 and 5 are secured transversely across the top and bottom of casing 1 adjacent opening 2, as shown in Figure 4. From Figures 4 and 5 it will be noted that each strip has spaced, transverse, parallel channels or notches 6, 7, 8 and 9 formed therein and that each channel is directly opposite a corresponding channel in the other strip to form therewith a pair.

A plate holder is provided for each of the channels. These holders may be formed of relatively thin sheet metal one of which is shown, before bending, at 10, Figure 6. A number of equally-spaced, parallel slots 14 are stamped or sawed in each holder. While 13 slots are shown, it will be understood that this number and spacing may be varied within reasonable limits. The slots of each pair of holders are equally spaced. After slotting, the holders are bent along the dotted lines indicated at a and b, Figure 6. Alternatively, the holders may first be bent and then slotted by sawing.

The holders are so proportioned that the bent ends fit over and embrace the opposite sides of strips 4 and 5, and may be secured thereto by means of screws passing through apertures in tabs integral with each holder as indicated at 15, Figure 4. When the holders are in position as shown at Figure 4, the ends of the slots in each are substantially coplanar with the bottom of the corresponding channel.

The slots 14 are of a width to receive metal plates which are, for example, chromium plated to form polished reflecting surfaces on both sides. Thus, when the holders, 10, 11, 12 and 13 are in place, each pair forms a series of guides into which a corresponding number of plates 16 may be slid and held in predetermined spaced parallel relation. If desired, retainers 17 and 18, Figure 1, having a width not greater than that of strips 4 and 5, may be secured to said strips to secure the plates against endwise displacement. There are thus formed right and left series of plates 19 and 20 each of which will hereinafter be termed a "louver." The spacing between the central plates of the louvers is approximately 2.6 inches, corresponding to the average interpupillary distance of human beings; and each louver has a range to embrace the greatest divergence from average that will be encountered.

Left and right coplanar targets 21 and 22, Figure 1, are mounted for translation toward and from each other at the end of the casing opposite opening 2. In the model selected for illustration, each target is affixed to a respective U-shaped member 23 or 24. The left member 23 has an aperture in one leg, tapped to receive the inner threaded end of a shaft 25, journaled in a bearing 26 carried by the wall of casing 1. A pulley 27 is fixed to shaft 26 and is connected by a belt 28, to a driving pulley 29. Pulley 29 is fixed to a shaft 30 journaled in bearings 31 and 32 carried by the wall of casing 1 adjacent opening 2. For convenience in operation, shaft 30 projects from the right side of the casing and has a knob 33 fixed to its projecting end. In a similar manner, obvious from inspection of Figure 1, member 24 and target 22 are translated in a direction transverse of casing 1 by threaded shaft 34, driven pulley 35, belt 36, and driving pulley 37 fixed to shaft 38. Shaft 38 is journaled adjacent shaft 30, and carries an operating knob 39.

Figure 2:
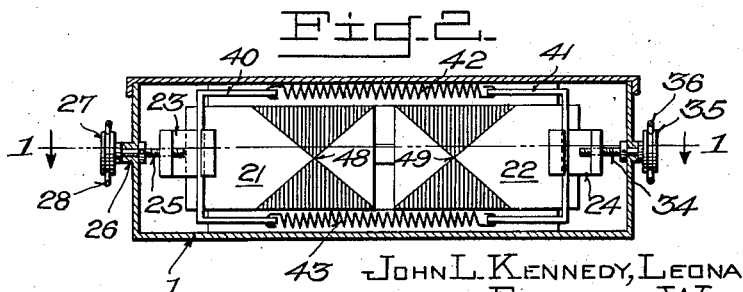
Figure 2 is a section taken substantially upon the line 2—2, of Figure 1, and showing the mechanical construction for effecting individual translation of the targets to vary their separation.

From Figure 2 it will be noted that targets 21 and 22 are continuously urged toward each other by means of a pair of yokes 40 and 41 engaging members 23 and 24 respectively, and having eyes formed at their ends. Corresponding pairs of eyes are connected by coil springs 42 and 43, whereby to take up any slack or play between the shafts 25 and 34 and members 23 and 24. Thus, as knob 33 is turned, target 21 is translated laterally of the line of sight, while target 22 is correspondingly translated upon turning of knob 39.

A scale 44 which may conveniently be graduated in inches and tenths, over a range between 2 and 3 inches, is fixed to one target, such as 22, by means of tabs 45 secured to target 22, and projecting through slot 46 in the adjacent end wall of casing 1. Likewise, an indicator tab 47 is attached to target 21 and projects through slot 46 to embrace scale 44. In the arrangement shown at Figure 3, indicator 47 is notched to form a vertical reading edge for scale 44. In the position of relative adjustment shown, the reading is a little more than 2.6". It will be understood that the targets, scale and indicator are so related that the indicated dimension on scale 44 is at all times the distance of separation of the centers of targets 21 and 22 as designated by the points 48 and 49, Figure 2. These points may be conveniently identified by the design shown, formed of any suitable contrasting colors, such as white and red. If desired, means for illuminating the targets may be provided such as reflectors 50 and 51, each having a lamp 52, carried on the inside side walls of the casing 1. Such lamps might be conveniently supplied from batteries mounted within the box and controlled by a switch conveniently located for the user.

In use, the person whose interpupillary distance is to be measured, places the instrument with hood 3 held against his head, and looks at targets 21 and 22 through the spaces between the plates 16. The particular spaces in the right and left louvers, through which he looks will be separated by the dimensions sought. With his left eye closed, the operator turns knob 39 to move target 22 until point 49 is seen between the two plates of the right louver between which his line of sight is passing. The determination of the proper adjustment of target 21 is greatly facilitated by the reflecting surfaces of the plates themselves. For, when point 48 is somewhat out of the proper adjustment for the individual using the instrument, the eye sees the point itself and one or more images thereof as reflected by the polished surfaces of the plates. On the other hand, when the point is properly centralized, the images of the point merge into the direct view of the point itself and create an unmistakable signal that correct adjustment has been effected.

Having thus properly adjusted target 22, the user makes a similar adjustment of target 21 by adjusting knob 33 while his left eye is open and right eye is closed. The correct interpupillary distance is then given on scale 44 by indicator 47. In Figs. 7, 8 and 9 we have shown a modified form of the invention wherein each part corresponding to that of the species of Figs. 1 to 6 is identified by the same numeral primed. Thus it is sufficient to mention casing 1'; targets 21' and 22' guided for horizontal translation toward and from each other and urged toward each other by springs, one of which is identified at 42', Fig. 7. As in Figs. 1-6, the respective targets are moved by members 23' and 24', engaged by threaded shafts 25' and 34', respectively.

Shaft 25' is journaled in casing 1' in the same manner as its counterpart in Figs. 1-6, but has a pinion 51 fixed thereto inside the casing. This pinion is in mesh with a pinion 52 fixed to a shaft 53 extending upwardly and rearwardly along the left side of the casing and having pinion 54 fixed to its rearward end. The latter pinion is driven by pinion 55 fixed on shaft 30'. As in the case of shaft 30, shaft 30' is journaled in the casing walls and extends transversely thereacross and has a knob 33' attached to its projecting right end. Shaft 30' passes through a differential 56 and has one side 56a secured to it.

The other side 56b of differential 56 is journaled upon shaft 30' and is unitary with a gear 57 which, in turn, meshes with a gear 58 fixed on shaft 38'. This shaft, as in Figs. 1-6, carries a knob 39'. It also has thereon a pinion 59 in mesh with a pinion 60 fixed to shaft 61 which is journaled in bearings on the right side of casing 1' and which extends forwardly to rotate shaft 34', by means of bevel pinions 62 and 63, in a manner obvious from inspection of Figs. 7 and 9.

The differential 56 has its spider connected to drive ring gear 64 which projects through a slot 65 in the top of the casing and there meshes with a pinion 66 fixed on shaft 67. The shaft 67 is journaled in bearings fixed to the casing top and has a bevel pinion 68 fixed to its inner end and which meshes with a pinion 69 fixed to indicator shaft 70. Shaft 70 carries an indicator 71 moving over a scale plate 72 supported in upright position on the casing top. The plate may have a scale 73 thereon conveniently graduated between 2 and 3 inches in decimal fractions thereof. The arrangement and ratios of gearing are such that the adjustments of knobs 33' and 39', which determine the positions of the targets 21' and 22', respectively, are algebraically added and the algebraic sum indicated by indicator 71. The indicated distance is, of course, at all times the separation of pre-located central points upon targets 21' and 22', corresponding to points 48 and 49, Fig. 2. The arrangement of the two series of spaced plates 19' and 20', and their mounting, may be identical with that shown in Figs. 4, 5 and 6. The operation of this species is also identical with that previously described in connection with Figs. 1 to 6, inclusive.

Thus it will be seen that we have provided an interpupillometer that is relatively simple and inexpensive to construct and that enables an individual to accurately and quickly determine his interpupillary distance without the assistance of an attendant. While we have disclosed a preferred form of the invention as now known to us, numerous modifications, alterations and substitutions will occur to those skilled in this art. Hence we do not wish to be limited to the precise details of construction shown, and the disclosure should be taken in an illustrative rather than a limiting sense. It is our desire to reserve all such substitutions and changes in construction, as fall within the scope of the subjoined claims.

Having now fully disclosed the invention, what we claim and desire to secure by Letters Patent is:

1. In an interpupillometer, a series of closely-spaced, parallel plates whereby to establish two parallel lines of sight separated by the interpupillary distance of an observer looking between said plates, a pair of targets movable individually across the respective lines of sight, each target having a viewing point designated thereon, and means responsive to the movements of said targets to indicate the separation of said points.

2. An interpupillometer as in claim 1, the surfaces of said plates being polished to act as light reflectors.

3. An interpupillometer comprising two spaced sets of parallel, closely-spaced plates, whereby to establish first and second parallel lines of sight between two pairs of plates separated by the interpupillary distance of an individual looking through said plates, a pair of targets each extending across a respective line of sight and having a point designated thereon, viewable between the plates of a respective set, said targets being movable toward and from each other in a plane normal to said lines of sight, and means responsive to movement of said targets to determine the separation of said points.

4. An interpupillometer comprising a frame, means on said frame providing a viewing opening for a subject to be measured, means adjacent said opening establishing a pair of parallel sight lines separated by the interpupillary distance of said subject, a pair of targets, each movable on said frame transversely of said sight lines, to bring designated points thereon into said sight lines, respectively, and indicator means connected for operation by movement of said targets to give the distance of separation of said points.

5. An interpupillometer comprising a frame having first means for contacting and locating the head of a subject in predetermined relation with respect thereto, second means on said frame establishing first and second parallel lines of sight separated by the interpupillary distance of said subject, said second means including at least one set of spaced plates each plate being normal to a third line connecting and perpendicular to, said lines of sight, means on said frame remote from said first means and defining a point viewable between said plates, adjusting means operable to move said point into one of said lines of sight, and means connected to be moved by said adjusting means to indicate the distance of said point from the other of said lines of sight.

6. An interpupillometer comprising a casing having a viewing opening through one end thereof, first means in said casing and adjacent said opening establishing first and second parallel lines of sight separated by a distance equal to the interpupillary distance of a subject looking into said opening, said means comprising two sets of spaced plates each plate being normal to a third line intersecting and perpendicular to, said first and second lines, and target means in said casing remote from said first means, operable parallel to said third line to determine the minimum distance between said first and second lines.

7. An instrument for measuring the interpupillary distance of the eyes of a user, comprising a pair of relatively fixed, laterally-spaced louvers, each said louver comprising a plurality of closely-spaced parallel plates, the plates of each louver being normal to a first line connecting said louvers, the distance between the central plates of said louvers being substantially the average interpupillary distance to be measured, said plates acting to establish lines of sight parallel thereto, and normal to said first line, targets remote from said louvers and individually movable transversely across said lines of sight in a direction parallel to said first line, a scale connected for movement with one target, a pointer connected for movement with the other target and cooperating with said scale to indicate the separation of predetermined points on the respective targets, and means under control of a subject looking through said louvers to individually and selectively move said targets.

8. In an interpupillometer, a casing having opposed parallel end walls, there being a viewing opening through one said wall, means establishing first and second parallel lines of sight separated by the interpupillary distance of a person looking through said opening into said casing, said means comprising first and second spaced sets of plates, the plates of each set being closely spaced, and normal to a third line connecting and perpendicular to said lines of sight, first and second targets, means mounting said targets at the other end of said casing for individual movement parallel to said third line, each target extending across a respective line of sight, means for individually moving said targets to bring designated points thereon into the respective lines of sight, and means responsive to movement of said targets to indicate the separation of said points transversely of said lines of sight.

9. An interpupillometer comprising a casing having spaced, vertical, first and second end walls, there being a viewing aperture in said first wall, right and left louvers in said casing adjacent said aperture, each louver comprising a series of closely-spaced vertical plates having polished reflecting surfaces, all of said plates being parallel, whereby, when an observer looks with his right and left eyes between the plates of said right and left louvers, respectively, a pair of parallel horizontal sight lines are determined, separated by the interpupillary distance of said observer, right and left vertical targets in said casing adjacent said second end wall, each target having a point designated thereon viewable through the plates of a respective louver, means mounting each target for movement in a common horizontal path across said lines of sight, a pair of knobs carried by said casing adjacent said first wall, operating connections between each knob and a respective target for individually moving said targets, a scale connected for movement with one target, and a pointer connected for movement with the other target and cooperating with said scale to indicate the separation of said points along said path.

10. An interpupillometer as in claim 9, each said target bearing a geometrical figure symmetrical about a vertical line through its said point whereby the superposed direct view of a target and its reflection in said plates, furnishes a positive indication of the adjustment of each point into the corresponding line of sight of an observer looking between said plates.

JOHN L. KENNEDY.
LEONARD C. MEAD.
BERTRAM WELLMAN.

REFERENCES CITED

The following references are of record in the file of this patent:

UNITED STATES PATENTS

| Number | Name | Date |
| --- | --- | --- |
| 1,990,459 | Mendelsohn | Feb. 5, 1935 |
| 2,361,534 | Eppenstein | Oct. 31, 1944 |
| 2,380,263 | Rees | July 10, 1945 |